United States Patent [19]

Tsujimoto et al.

[11] Patent Number: 5,930,949
[45] Date of Patent: Aug. 3, 1999

[54] HYDRATION OF SEEDS WITH PARTIALLY HYDRATED SUPER ABSORBENT POLYMER PARTICLES

[75] Inventors: Takeo Tsujimoto; Hiroshi Sato; Shinya Matsushita, all of Shiga, Japan

[73] Assignees: Takii Shubyo Kabushiki Kaisha, Kyoto; T.S. Plant Science Institute Co. Ltd., Shiga; Dai-Ichi Kogyo Seiyaku Co., Ltd., Kyoto, all of Japan

[21] Appl. No.: 08/939,459

[22] Filed: Sep. 29, 1997

Related U.S. Application Data

[63] Continuation of application No. 08/457,966, Jun. 1, 1995, abandoned.

[30] Foreign Application Priority Data

Jun. 10, 1994 [JP] Japan .................................... 6-128984

[51] Int. Cl.$^6$ .............................. A01C 1/06; A01B 79/00; C12N 5/04
[52] U.S. Cl. ........................... 47/57.6; 47/58; 47/DIG. 9; 47/DIG. 11; 435/430
[58] Field of Search ........................ 47/57.6, 58, DIG. 9, 47/DIG. 11; 435/430; 800/200

[56] References Cited

U.S. PATENT DOCUMENTS

| | | | |
|---|---|---|---|
| 3,905,152 | 9/1975 | Loperfido | 47/57.6 |
| 4,465,017 | 8/1984 | Simmons | 427/242 |
| 4,562,663 | 1/1986 | Redenbaugh | 47/58 |
| 4,583,320 | 4/1986 | Redenbaugh | 47/57.6 |
| 4,715,143 | 12/1987 | Redenbaugh et al. | 47/57.6 |
| 4,753,035 | 6/1988 | Ryan et al. | 47/57.6 |
| 4,769,945 | 9/1988 | Motoyama et al. | 47/57.6 |
| 4,779,376 | 10/1988 | Redenbaugh | 47/57.6 |
| 4,780,987 | 11/1988 | Nelsen et al. | 47/57.6 |
| 4,808,430 | 2/1989 | Kouno | 427/4 |
| 4,912,874 | 4/1990 | Taylor | 47/58 |
| 5,236,469 | 8/1993 | Carlson et al. | 47/57.6 |
| 5,458,888 | 10/1995 | Chen | 424/464 |

FOREIGN PATENT DOCUMENTS

| | | |
|---|---|---|
| 0187341 | 7/1986 | European Pat. Off. . |
| WO 91/05459 | 5/1991 | European Pat. Off. . |
| 0309551 B1 | 5/1993 | European Pat. Off. . |
| 2192781 | 1/1988 | United Kingdom . |
| WO88/07318 | 10/1988 | WIPO . |

OTHER PUBLICATIONS

Scientia Horticulturae, vol. 37,1988, pp. 1–11, "SMP: Solid Matrix Priming of Seeds" by Taylor er al.

Nature, vol. 246, Nov. 2, 1973, pp. 42–44, "Accelerated Germination by Osmotic Seed Treatment" by Heydecker et al.

Chinese Science Bulletin, vol. 32, No. 20, Oct. 1987, Beijinng (CN), pp. 1438–1439, "Effect of Osmotic Priming with SPP on Seed Germination" by Weineng et al.

Proceedings of the Symposium on Stand Establishment of Horticultural Crops; Department of Horticultural Sciences, New York State Agricultural Experiment Station, Cornell University; "Matriconditioning of Seeds to Improve Emergence" by A.A. Khan, H. Miura, J. Prusinski and S. Ilyas; Apr. 4–6, 1990.

*Primary Examiner*—David M. Naff
*Attorney, Agent, or Firm*—Jordan and Hamburg LLP

[57] ABSTRACT

The germination of seeds is improved by treating the seeds with a solid-form super absorbent polymer that has absorbed water. Super absorbent polymer particles that contain an amount of water such as about 5 to 7 times their weight that is significantly less than the amount of water they are able to absorb such as about 80–120 times their weight and do not substantially adhere to each other are mixed with seeds to form a mixture that may contain a volume ratio of seeds to polymer particles of 0.2 to 5:1. The mixture is stirred while supplying air or gaseous oxygen into the mixture for a time and at a temperature sufficient to cause the seeds to imbibe sufficient water to enhance their vigor for sprouting, but insufficient to cause sprouting. The mixture is sieved to obtain seeds having essentially no adhering polymer residue of the particles, after which the seeds may be dried. The polymer particles may be spherical, and before absorbing water have a size of 50 to 300 $\mu$m. A fine powder of hydrophobic material such as silica, calcium stearate, magnesium stearate or barium stearate may be coated on the polymer particles before or after absorbing water in an amount of 0.1 to 5 weight percent to further prevent adhesion between the particles.

16 Claims, 7 Drawing Sheets

HYDRATION OF SEEDS WITH PARTIALLY HYDRATED SUPER ABSORBENT POLYMER PARTICLES

This application is a continuation of application Ser. No. 08/457,966, filed Jun. 1, 1995, now abandoned.

BACKGROUND OF THE INVENTION

The present invention relates to a method of improving germination by subjecting seeds to presowing hydration treatment. More particularly, it relates to a hydration treatment technology seeds prior to sowing for the purpose of achieving rapid and uniform germination of seeds after sowing and improving the germinating rate even in an adverse environment.

Once sowed, seeds germinate after a certain period of time if environmental conditions such as moisture, temperature, oxygen and light are all appropriate.

During this pregermination period from sowing to germination, various metabolic processes proceed within seeds. The length of said period varies depending on the degree of maturity of each individual seed, the kind of seed, and such environmental factors such as temperature and moisture content. Shortening of said pregermination and attaining rapid and uniform germination will facilitate cultivation management and, in commercial production, offers such advantages as reduction in production costs and labor.

For such purposes, seeds are subjected to hydration treatment prior to sowing. Thus, a method so far practiced in spinach cultivation, for instance, comprises immersing seeds in well water for a day (germination enhancing treatment), followed by sowing. In recent years, other seed hydration techniques, such as priming, osmoconditioning and matriconditioning, have been developed and proved to be effective in enhancing germination and/or in improving the germination rate in adverse environments, among others.

The principle of the seed hydration technology such as priming, germination following sowing by supplying seeds before sowing with water and treating them for a time and at a temperature sufficient to cause the seeds to imbibe sufficient water to enhance resultant plant vigor but insufficient to cause seeds sprouting. Among the various seed hydration techniques reported to date as the fruits of research and development work, the following four may be mentioned as principal ones:

(1) Priming

This technique was developed by W. Heydecker et al. in 1974 and comprises osmotically controlling the water supply to seeds using, as a medium, an aqueous solution of a water-soluble polymer (polyethylene glycol, sodium polypropenate, etc.) or an aqueous salt solution (W. Heydecker, J. Higgins and R. L. Gulliver, 1973, Nature (London) 246s42–44; W. Heydecker, 1974, Univ. Nottingham Sch. Agr. Rep. 1973/1974:50–67; Zuo Weineng et al., 1987, Chinese Science Bulletin 32:1438).

(2) Drum priming

This technique developed by H. R. Rowse in 1987 comprises supplying seeds with water by spraying in a rotating drum to thereby directly control the weight of water to be supplied to seeds, without using any medium (British Patent 2192781).

(3) Solid matrix priming

This technique developed by A. G. Taylor et al. in 1988 comprises controlling the water supply to seeds using, as a medium, a pulverized leonardite shale material (Agro-Lig) (A. G. Taylor, D. S. Klein and T. H. Whitlow, 1988, Scientia Horticulturae 37 (1988) 1–11; U.S. Pat. No. 4,912,874; European Patent 0309551B1;W088/07318).

(4) Matriconditioning

This technique developed by A. A. Khan et al. in 1990 comprises controlling the water supply to seeds using, an a medium, a water-insoluble porous material (Micro-Cel E, Zonolite) (A. A. Khan, H. Miura, J. Prusinski and S. Ilyas, Proceedings of the Symposium on Stand Establishment of Horticultural Crops/Minneapolis, Minn., Apr. 4–6, 1990).

Common features of the four techniques mentioned above are that they are all seed hydration techniques to be performed on seeds prior to sowing and that only those various metabolic processes that proceed within seeds during the pregermination are artificially driven to completion prior to sowing by controlling the supply of water to seeds.

Differences among them are found in the respective water content controlling principles. In (1), a liquid is used as a medium and the water supply to seeds is controlled by the osmotic potential of the liquid. In (2), no medium is used and the water content is directly controlled in terms of weight of water. In (3) and (4), a water-insoluble solid medium is used and the water content is controlled by means of an osmoticum and/or a matric potential.

These techniques are comparably effective in improving germination but each has its drawbacks, as mentioned below.

The priming technique mentioned under (1) is not suited for large quantity treatment on a commercial scale since the polyethylene glycol solution or the like solution to be used has a high viscosity, the solubility of oxygen in the solution is low and time is required in drying seeds after treatment.

The drum priming technique mentioned under (2) is simple and clear-cut but is difficult to put into practice since precise mechanical control is required for regulating the quantity of water and accordingly the mechanical equipment and procedure become substantially complicated.

The techniques mentioned under (3) and (4), which make use of the matric potential or the like of a water-insoluble solid medium, can treat seeds in simple equipment and have solved the problem of oxygen supply. However, the powdery solid medium remains, adhering to the treated seeds, and it is difficult to separate it by sieving. The solid medium particles adhering to the seeds after treatment cause dust in the process of packaging and/or distribution of the seeds. This may also leads to serious impairment of the value of the seeds as commercial products.

SUMMARY OF THE INVENTION

It is an object of the present invention to provide a method of improving the germination of seeds in which no solid medium particles adhere to or remain on seeds and the seeds after hydration treatment can be dried with ease.

As a result of investigation made by the present inventors in search of a better technique of seed hydration treatment, it was found that the use of a highly water-absorbing polymer can lead to attainment of the above object, providing a seed hydration technique not only effective in improving germination but also easy to commercialize. Based on this finding, the present invention has now been completed.

Thus, the present invention consists of a method of improving the germination of seeds which comprises adding seeds to a superabsorbent (highly water-absorbing) polymer in solid form which has absorbed water, and treating the seeds for hydration, while supplying an oxygen-containing gas, for a time and at a temperature sufficient to cause the seeds to imbibe sufficient water to enhance resultant plant vigor but insufficient to cause seeds sprouting.

In accordance with the present invention, a superabsorbent polymer is used as the medium for providing seeds with water and the water supply to seeds is controlled by making use of the slow water release property characteristic of the superabsorbent polymer. The principle of slow water release is not yet fully known but it is that an interaction between the water-absorbing potential (affinity of the superabsorbent polymer for water, osmotic potential of water against the gel) of the superabsorbent polymer and the preventive potential thereof against water absorption (elastic stiffness due to the three-dimensional network structure of the superabsorbent polymer) results in the expression of the slow water release property. In this respect, the method of the present invention differs essentially from the prior art techniques which utilize the osmotic potential or capillarity.

More particularly, the prior art techniques comprise wetting the seed coat (seed surface) directly with a large quantity of water and controlling the penetration of water from the seed coat into the inner parts of the seed in the presence of an osmoticum and/or a medium having matric potential. On the contrary, the method of the present invention causes only a slight extent, from the time and space viewpoint, of direct wetting of the seed coat with water in liquid form but allows seeds to absorb, through the seed coat, only a very small amount of water in gaseous or liquid form as released from the superabsorbent polymer that contains a large amount of water and has a hydrophobic surface. This transport mechanism provision is essentially different from those in the prior art techniques.

Furthermore, it has been established by nuclear magnetic resonance (NMR) spectrometry that the mechanism of water by the superabsorbent polymer involves nonfreezable water immobilized by hydroxyl groups of the superabsorbent polymer, bound water coupled to nonfreezable water via hydrogen bonding, and free water around bound water. This mechanism is quite distinct from the matric potential or the mechanism of water holding by a salt or hydrophilic polymer in the prior art techniques.

Therefore, the method of the present invention allows reduced adhesion of the treatment medium to seeds and facilitates the separation thereof, hence is industrially useful.

DETAILED DESCRIPTION OF PREFERRED EMBODIMENTS

Figure 1:
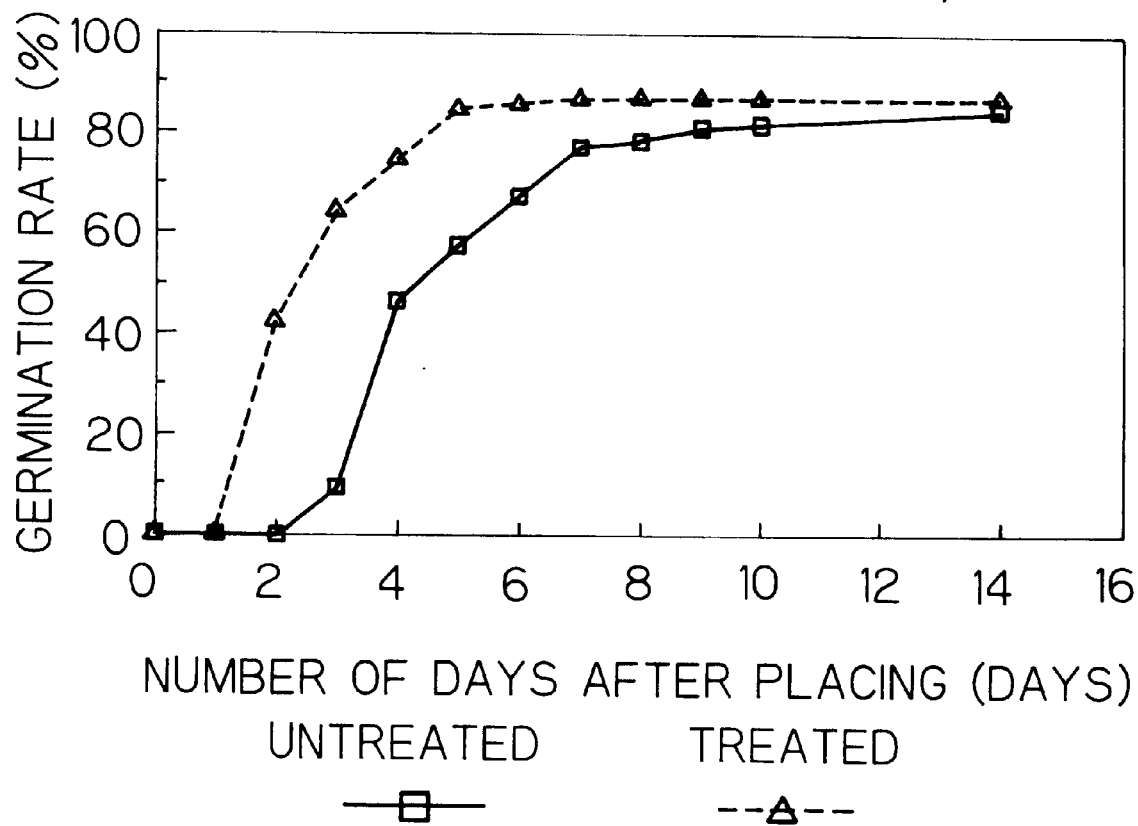
FIG. 1 is a graphic representation of the relationship between the number of days after placing and the germination rate in a carrot seed germination test.
Figure 2:
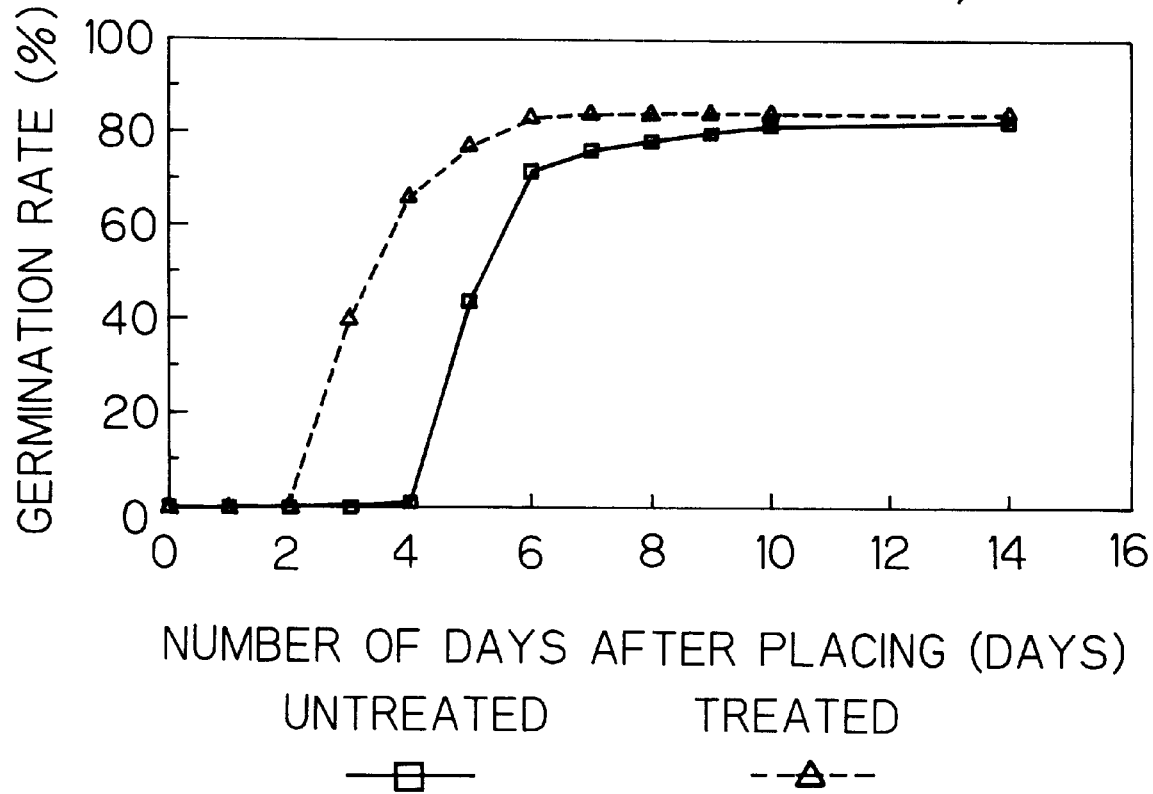
FIG. 2 is a graphic representation of the relationship between the number of days after placing and the germination rate in a celery seed germination test.
Figure 3:
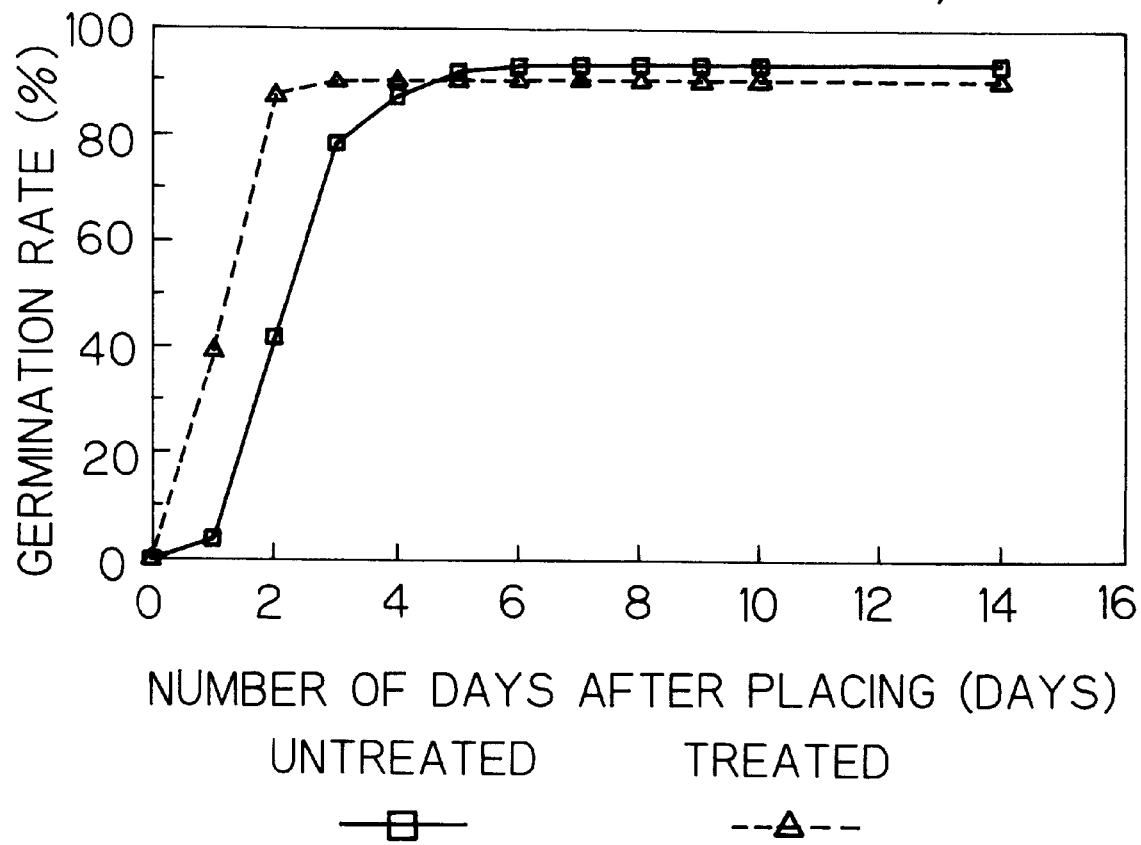
FIG. 3 is a graphic representation of the relationship between the number of days after placing and the germination rate in a spinach seed germination test.
Figure 4:
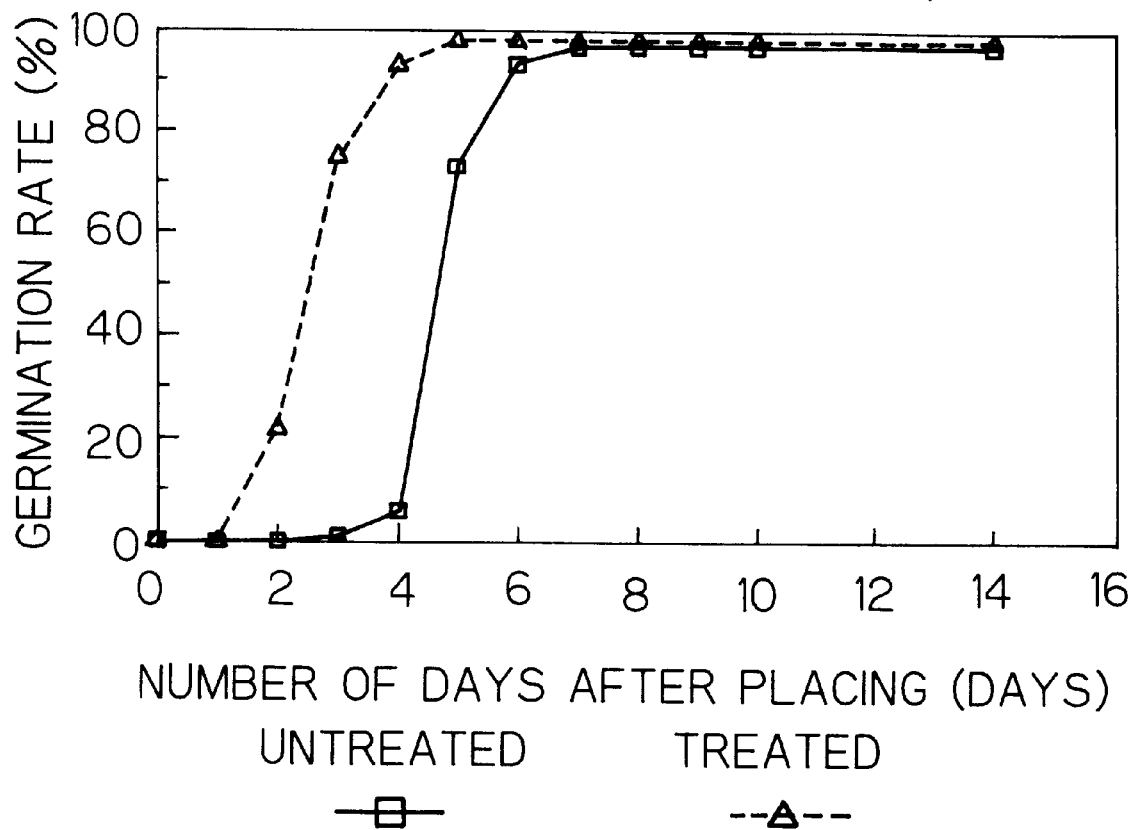
FIG. 4 is a graphic representation of the relationship between the number of days after placing and the germination rate in an onion seed germination test.
Figure 5:
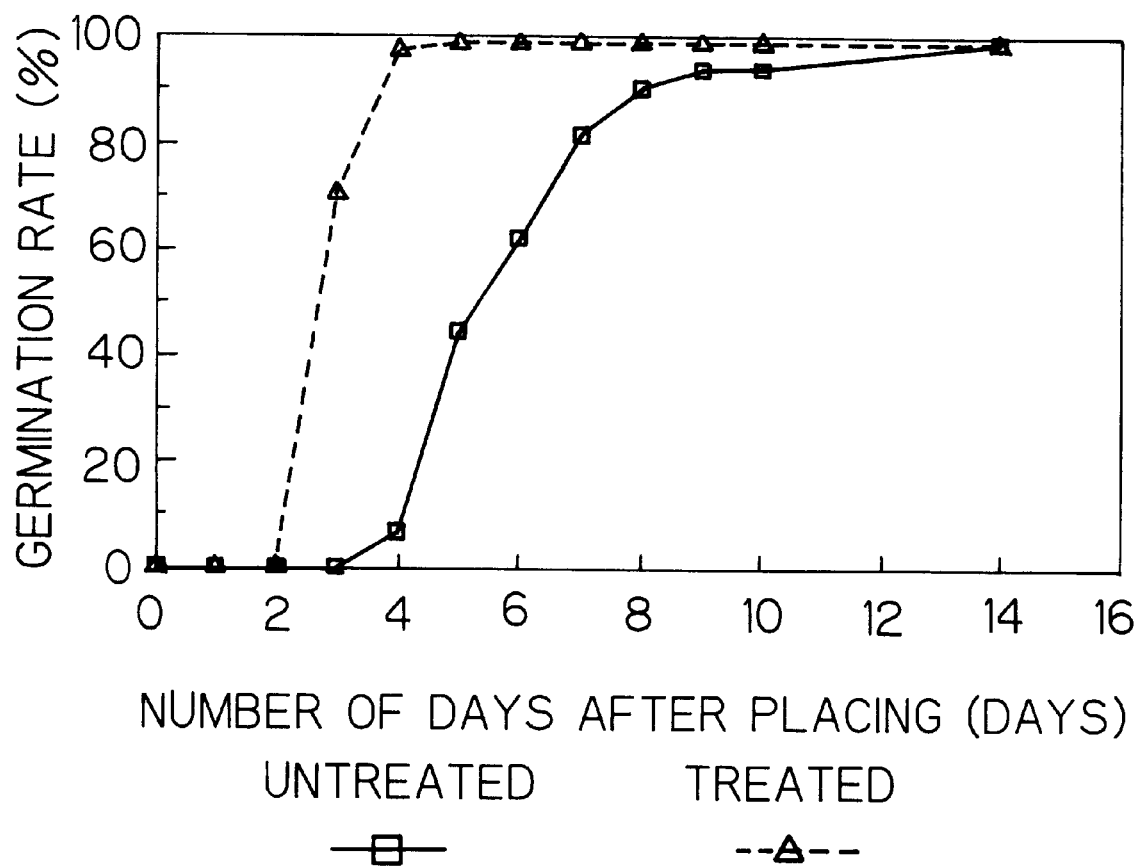
FIG. 5 is a graphic representation of the relationship between the number of days after placing and the germination rate in a pansy seed germination test.

The superabsorbent polymer to be used in the practice of the invention may be a commercial product. The superabsorbent polymer is a chemical product having an insolubilized structure as derived by a suitable method from a water-soluble polymer such as polyelectrolyte, and includes, for example, crosslinked polyacrylic acid salts, crosslinked isobutylene-maleic acid copolymer derivatives, crosslinked starch-polyacrylic acid salts, crosslinked polyvinyl alcohol-polyacrylic acid salts, cross-linked polyvinyl alcohol derivatives, crosslinked polyethylene glycol derivatives and crosslinked carboxymethylcellulose derivatives. Any such chemical product may be used irrespective of species if it has the following characteristics:

(1) High water-absorbing power;
(2) Appropriate slow water release property;
(3) pH is harmless to seeds (neutral regions 5–9);
(4) Appropriate particle size (enabling separation from seeds);
(5) Appropriate flowability after water absorption (rendering mutual adhesion of water-holding gel particles difficult);
(6) Safety to the human body.

As regards the shape, powder forms are preferred and, among them, the spherical form is particularly preferred since it shows a weak tendency toward mutual adhesion and an appropriate flowability even after water absorption. The size thereof is not critical but commercial products having a particle size of 10 $\mu$m to 3 mm in dried state are available and, among them, those having a particle size of 50 to 300 $\mu$m are easy to handle, hence preferred. The water absorption factor is not critical, either. However, those capable of absorbing 10 to 1,000 times their empty weight of water are preferred. After absorption of water, the superabsorbent polymer in solid form should preferably become spherical.

Rendering the surface of the superabsorbent polymer hydrophobic by adding a small amount of a finely divided hydrophobic agent, for example hydrophobic silica or a metal soap such as calcium stearate, magnesium stearate or barium stearate, to the superabsorbent polymer in dry form or the superabsorbent polymer after water absorption caused by addition of an appropriate amount of water preferably increases the flowability of the superabsorbent polymer and decreases the mutual adhesion of particles of said polymer, whereby the procedure for controlled hydration is facilitated. Superabsorbent polymers given an increased degree of hydrophobicity by increasing the degree of crosslinking may also be used.

A generalized mode of practice of the present invention is as follows.

The superabsorbent polymer is caused to absorb several times its empty weight of water. (The amount of water to be absorbed is dependent on the superabsorbent polymer and/or the seeds to be treated (target seeds).) On that occasion, if necessary, 0.1 to 5% by weight, based on the superabsorbent polymer, of a hydrophobic agent is added to said polymer before or after water absorption, followed by mixing to thereby coat the surface of the superabsorbant polymer with the hydrophobic agent.

The, 0.2 to 5 parts by volume of seeds are added to a part by volume of the superabsorbent polymer after water absorption, and the whole is stirred to achieve mixing.

Thereafter, the resulting mixture is maintained at a temperature of about 10 to 30° C. (normally at the optimal temperature for the germination of target seeds) for a period of 1 to 14 days (the time required for intra-seed metabolic processes to proceed; normally, the time required for germination following sowing of target seeds ±α). During the maintenance period, an oxygen-containing gas necessary for the metabolism and respiration of seeds is supplied to the superabsorbent polymer-seed mixture. The oxygen-containing gas is, for example, air, gaseous oxygen, or a mixture of oxygen and some other gas. The oxygen-containing gas is supplied by aeration or by replacement charging of oxygen or air. On the occasion of aeration, to prevent drying of the system, air is preferably supplied after moistening thereof to some extent as necessity requires. For uniform treatment, the mixture should preferably be stirred intermittently or continuously.

After the lapse of the maintenance period, the superabsorbent polymer is separated from the seeds using a sieve of an appropriate mesh size. Since the superabsorbent polymer hardly adheres to the seed surface, it can easily be separated without damaging the seeds.

If necessary, the seeds after such separation are dried. Since, however, the amount of water adhering to the seeds is small and insufficient for germination, even the seeds in an undried state, when placed under low-temperature and low-humidity conditions, can be stored for a short period while maintaining the controlled hydration effect. Once treated in this way, the seeds, that are originally durable, start their active life activity and become susceptible to damaging by heat drying. Therefore, it is desirable to carry out the drying at a temperature as low as possible and in a time as short as possible.

Any seeds, large or small, may be treated in accordance with the present invention. For example vegetable seeds such as carrot seeds and lettuce seeds as well as pansy seeds and other ornamental plant seeds may be so treated.

The seeds may also be treated with a pesticide or the like before or after hydration treatment. It is further possible to subject them to film coating and/or pelleting after hydration treatment.

In accordance with the present invention, seeds can be treated without significant adhesion and retention solid medium particles to and on the seeds and, in addition, the seeds after hydration treatment can be dried with ease, hence improved seeds capable of germinating rapidly and uniformly can be commercially produced at low cost without damaging them.

The following examples further illustrate the present invention but are by no means limitative of the scope of the present invention.

EXAMPLE 1

A crosslinked polymer derived from polymerization of acrylic acid salt monomer (PQ Polymer BL100; Product of Osaka Organic Chemical Industry Co., Ltd) was used as the superabsorbent polymer. This superabsorbent polymer has the characteristics shown in Table 1.

TABLE 1

| | |
|---|---|
| Appearance | white powder (particle) |
| Average particle size | 70–150 μm |
| Bulk specific gravity | about 1.00 |
| Water content | not more than 5% |
| pH | neutral (0.1% dispersion) |

TABLE 1-continued

| | |
|---|---|
| Water-absorbing power | deionized water - 80–120 times; 0.9% sodium chloride solution - 25–35 times |
| Expansion ratio | 2–3 times (volume ratio at 10 times water absorption = particles after water absorption/water added) |

The target seeds (seeds to be treated) used were seeds of carrot (*Daucus carota* L.), celery (*Apium graveolens* L.), spinach (*Spinacia oleracea* L.), onion (*Allium cepa* L.), pansy (*Viola x wittrockiana*), and lettuce (*Lactuca sativa* L.).

Into a tightly closable cylindrical vessel (500 ml capacity) having small openings for aeration was poured 150 ml of a mixture of water and 0.1% of a thiuram-containing wettable powder (a pesticide for preventing propagation of germs), followed by weighing and charging of 30 g (for the cases in which the water absorption factor was 5 times) of the superabsorbent polymer.

After uniform water absorption by the superabsorbent polymer, 1% by weight, based on the superabsorbent polymer, of a hydrophobic agent (0.3 g of calcium stearate) was added to said polymer, followed by stirring and mixing for coating the surface of the superabsorbent polymer particles, that had absorbed water, with the hydrophobic agent (calcium stearate).

A volume of 100 ml of the target seeds were measured and charged into the cylindrical treatment vessel containing the hydrophobic agent-coated superabsorbent polymer. After tight closure, seed treatment was carried out with intermittent stirring using a Mix Rotor (powder mixer) in a constant-temperature room maintained at a specified temperature for a specified period of time. The conditions employed in treating the respective crop seeds were as shown in Table 2.

The water absorption factor to be attained by the superabsorbent polymer, the mixing ratio with seeds, the treatment temperature, the number of treatment days, and other conditions depend to some extent on the target seed species and the lot of seeds, hence were determined by performing preliminary tests.

The mode of oxygen supplying into the vessel during treatment somewhat varies depending on the ratio of the volume of the superabsorbent polymer-seed mixture to the capacity of the treatment vessel and on the length of treatment time. In this example, continuous aeration was employed in cases where a relatively long period of treatment was necessary, and exchange charging of oxygen in cases where a short period of treatment was sufficient. The continuous aeration mode comprises continuously supplying a small amount of air using an air pump, while the exchange charging of oxygen comprises charging high-concentration oxygen gas (90% concentration) into the vessel using an oxygen cylinder (bomb), followed by tight closure of the vessel, said exchange charging being repeated at 24-hour intervals.

TABLE 2

| Crop | Times water absorption by superabsorbent polymer | Treatment temperature | Treatment period | Method of aeration |
|---|---|---|---|---|
| Carrot | 5 times | 20° C. | 5 days | Cont. ae. |
| Celery | 6 times | 20° C. | 10 days | Cont. ae. |
| Spinach | 6 times | 20° C. | 3 days | Oxy. ex. |

TABLE 2-continued

| Crop | Times water absorption by superabsorbent polymer | Treatment temperature | Treatment period | Method of aeration |
|---|---|---|---|---|
| Onion* | 7 times | 20° C. | 3 days | Oxy. ex. |
| Lettuce | 5 times | 20° C. | 1 day | Oxy. ex. |
| Pansy | 5 times | 20° C. | 7 days | Cont. ae. |

Cont. ae. = Continuous aeration.
Oxy. ex. = Exchange charging of oxygen.
*The superabsorbent polymer was used without hydrophobic agent treatment.

After the lapse of the predetermined treatment period, the superabsorbent polymer was separated from the seeds using a sieve having an appropriate mesh size and the seeds were dried at 35° C. in a ventilated oven. Adjustment was made so that the water content of the seeds after drying was almost equal to the water content of the meeds before treatment.

The treated and dried seeds were subjected to a germination test for confirming the germination improving effect. The germination test was carried out essentially in accordance with the standards of the International Seed Testing Association (ISTA). The seeds were placed in petri dishes.

Day 14 was selected as the final count day for germination, and the average number of days for germination was calculated as an index indicative of the rapidity of germination. The average number of days for germination was calculated by the formula:

$$\sum_{k=1}^{n}(k \times Gk) \div \sum_{k=1}^{n} Gk$$

where k is the number of post-placing days and Gk is the number of individual seeds which germinated after k days following placing. The values 14, corresponding to the final count germination day 14, was employed as n.

The germination test results thus obtained are shown in Tables 3 and 4 and in FIGS. 1 to 5.

(Improvement in rapidity of germination)

As shown in Table 3 and FIGS. 1 to 3 and 5, enhanced germination due to the controlled hydration treatment was observed with carrot, celery, spinach and pansy seeds. The effect was particularly remarkable in carrot, celery and pansy where a relatively large number of days was needed for the germination of untreated seeds. In these three crops, shortening by about 2 days in terms of the average germination day was observed.

TABLE 3

Effect of reducing the number of days for germination

| Crop | | Germination test temperature (° C.) | Average germination day (days) | Germination rate (%) |
|---|---|---|---|---|
| Carrot | untreated | 20 | 4.45 | 84.7 |
| | treated | 20 | 2.32 | 87.0 |
| Celery | untreated | 20 | 6.21 | 82.3 |
| | treated | 20 | 3.36 | 83.0 |
| Spinach | untreated | 20 | 2.43 | 93.3 |
| | treated | 20 | 1.31 | 90.2 |
| Onion | untreated | 10 | 5.21 | 96.7 |
| | treated | 10 | 3.07 | 96.0 |
| Pansy | untreated | 20 | 5.11 | 98.9 |
| | treated | 20 | 3.12 | 97.3 |

(Improvement in rapidity of germination at low temperature condition)

In an onion germination test performed at the optimal germination temperature (20° C.), seeds treated for controlled hydration showed substantially the same germination performances as compared with untreated seeds (data not shown). In the onion germination test performed at the lower temperature (10° C.), treated seeds showed markedly enhanced germination as compared with untreated seeds and the average germination date was observedly reduced. See Table 3 and FIG. 4.

(Improvement in germination rate at high temperatures)

At high temperatures, lettuce seeds fall into a state of secondary dormancy. In spite of this fact, improved germination rates were observed at a high temperature (35° C.) with all the four varieties tested after controlled hydration according to the invention (see Table 4). While the germination rates for untreated seeds were 0–12.0%, seeds treated for controlled hydration showed germination rates of 74.7–96.0%. The effect of the controlled hydration treatment was thus striking.

TABLE 4

| | | Germination rate at 20° C. (%) | Germination rate at 35° C. (%) |
|---|---|---|---|
| Sacrament | untreated | 97.5 | 12.0 |
| | treated | 98.5 | 96.0 |
| Cisco | untreated | 96.0 | 0.3 |
| | treated | 95.5 | 89.7 |
| Red Fire | untreated | 92.0 | 1.0 |
| | treated | 95.0 | 74.7 |
| Green Wave | untreated | 97.5 | 0.0 |
| | treated | 98.5 | 89.7 |

EXAMPLE 2

Seeds treated for controlled hydration in accordance with the invention were tested for the separability from the medium, the degree of difficulty in drying them in a drying step, and the amount of the solid medium still adhering to them after treatment, for comparison with the prior art techniques (Comparative Examples).

Thus, 50 grams of onion seeds and 50 grams of carrot seeds were weighed and each subjected to priming (osmotic priming (hereinafter briefly referred to as OP) as distinguished from SMP; Comparative Example), solid matrix priming (hereinafter briefly referred to as SMP; Comparative Example), matriconditioning (hereinafter briefly referred to as MC; Comparative Example) and hydration treatment with the superabsorbent polymer in accordance with the present invention (hereinafter briefly referred to as HSAP; Example), respectively for controlled hydration.

The controlled hydration treatment was conducted under the conditions shown in Table 5. The treatment temperature and treatment period were standardized at 15° C.×5 days in the case of onion seeds and at 20° C.×7 days in the case of carrot seeds.

TABLE 5

| | Method | Medium | Crop | Outline of treatment conditions (mixing ratio by weight of seed:medium: water in parentheses) | Material weight (g) | | |
|---|---|---|---|---|---|---|---|
| | | | | | Seeds | Medium | Water |
| Comparative Example | OP | Sodium poly-propenate (SPP) | Onion | With 10 wt % aqueous solution of SPP | 50 | 50 | 450 |
| | | | Carrot | With 10 wt % aqueous solution of SPP | 50 | 100 | 900 |
| | SMP | Finely divided shale (Agro-Lig) | Onion | At mixing ratio (1.0:2.0:1.6) | 50 | 100 | 80 |
| | | | Carrot | At mixing ratio (1.0:1.5:1.35) | 50 | 75 | 67.5 |
| | MC | Calcium silicate (Micro-Cel E) | Onion | At mixing ratio (16:4.9:20) | 50 | 15 | 62.5 |
| | | | Carrot | At mixing ratio (16:8.0:32) | 50 | 25 | 100 |
| Example | HSAP | Superabsorbent polymer (PQ Polymer BL100) | Onion | At 7 times water absorption | 50 | 20 | 140 |
| | | | Carrot* | At 5 times water absorption | 50 | 40 | 200 |

OP: Osmotic priming.
SMP: Solid matrix priming.
MC: Matriconditioning.
HSAP: Controlled hydration treatment with superabsorbent polymer.
*: Superabsorbent polymer used after treatment with hydrophobic silica.

After completion of the controlled hydration treatment, the OP-treated seeds were placed in a nylon mesh bag, washed with water and dehydrated. The seeds and the medium (sodium polypropenate solution) were thus separated from each other.

In the case of SMP, MC and HSAP, the seeds were separated from the solid medium using a sieve. Depending on the seed size, a 12-mesh sieve was used for onion seeds and a 14-mesh sieve for carrot seeds, and comparison was made with respect to the degree of difficulty in sieve separation of the seeds from the medium.

After separation from the medium, the seeds were dried at 40° C. in a ventilated oven. For seed drying, the seeds were spread evenly in the oven. The seeds subjected to the respective controlled hydration treatments were compared with respect to the degree of difficulty in drying by measuring and recording the water content in seeds at timed intervals. The water content in seeds was measured at the start of drying and at the time of completion using a Cho electronic balance NC-30MB. Water content in each seeds in the course of drying was determined by calculation based on the weight loss.

After drying, the seeds were rubbed together to an extent not to damage them to thereby forcedly peel off that portion of the medium remaining on the seed surface, and the seeds and medium were separated and recovered again by sieving. For each medium, the ratio of the amount of the medium thus peeled off and separated to the total amount of the medium used for controlled hydration treatment was calculated as the residual adhesion percentage. Comparative surface observation of the finally treated seeds was also made.

The results obtained with respect to the separability of seeds from medium, the degree of difficulty in seed drying, and the residual percentage of medium adhering to seeds were as follows.

(Separability of seeds from medium)

In the case of OP, seeds could be separated easily and reliably from the medium (sodium polypropenate solution) by washing the seeds with water.

In the case of SMP and MC, the water-holding medium (Agro-Lig, Micro-Col E) adhered firmly to the seed surface and at the same time formed lumps greater in size than the seeds, hence sieving failed to separate the seeds from the medium with certainty. In particular, carrot seeds having an uneven surface allowed marked adhesion of the medium thereto. Even in the case of onion seeds, significant adhesion of the medium was observed in the depressions in the seed coat. At the same time, significant adhesion of the medium to the treatment vessel, sieve and other apparatus used was also observed.

In the case of HSAP, no adhesion of the medium occurred to the seeds, treatment vessel, sieve and other apparatus used. The seeds could be separated from the medium easily and reliably by sieving. The operability thereof was further improved by addition of hydrophobic silica.

(Degree of difficulty in seed drying)

Figure 6:
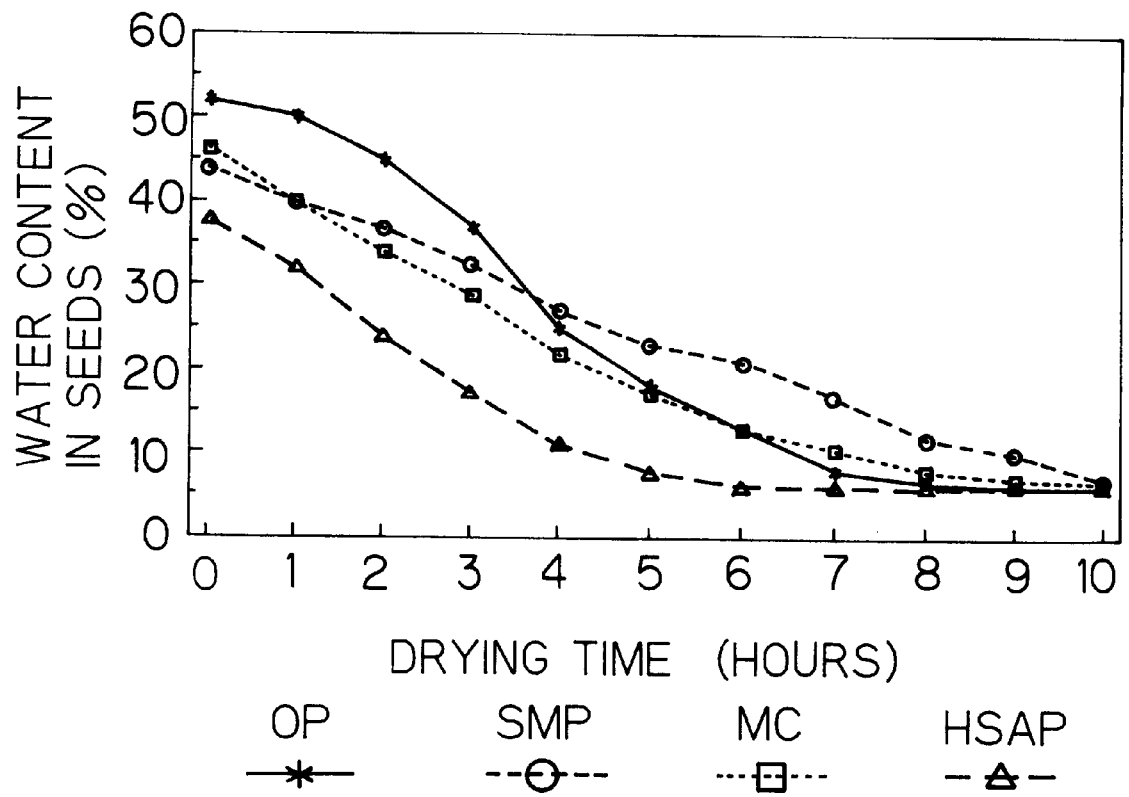
FIG. 6 is a graphic representation of the relationship between the drying time and the water content in seeds in an onion seed drying test.
Figure 7:
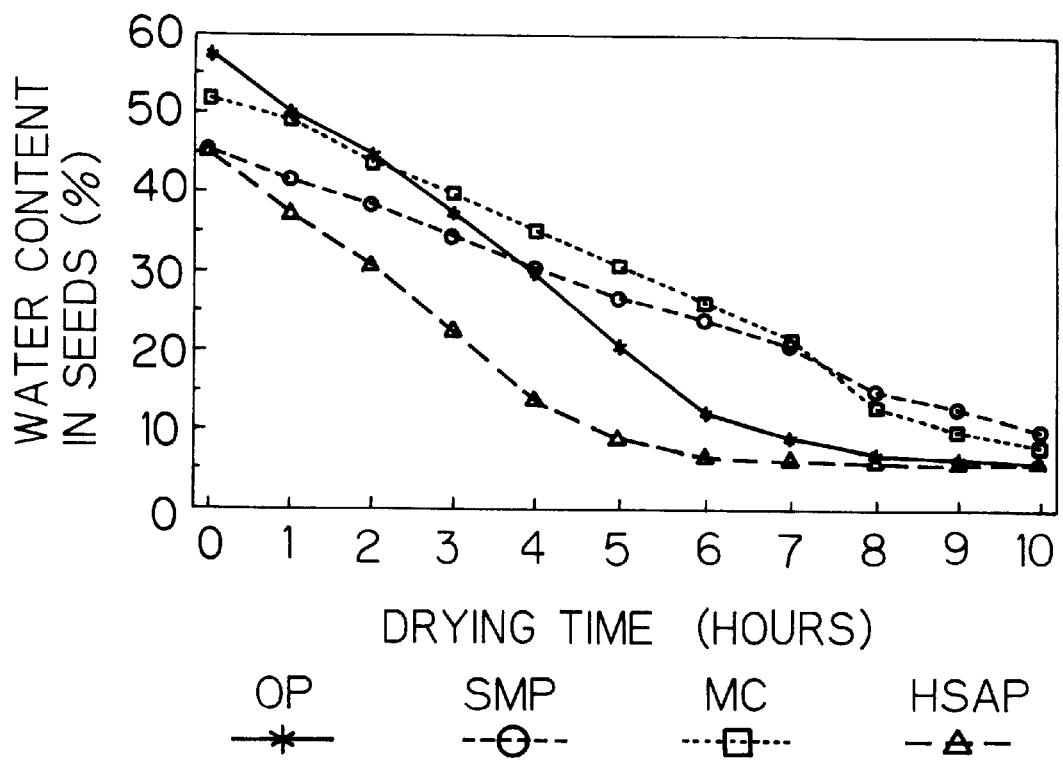
FIG. 7 is a graphic representation of the relationship between the drying time and the water content in seeds in a carrot seed drying test.

As shown in FIGS. 6 and 7, the HSAP-treated onion and carrot seeds could be dried efficiently; the water content therein decreased in the shortest time as compared with the other treatments. The rate of drying until the water content returned to the water content in untreated seeds before water absorption (about 10%) decreased in the order HSAP>OP>MC≧SMP. In MC and SMP, the drying curve showed a gentle inclination and a long period of time was required for seed drying. This is apparently due to the fact that a large amount of the water-holding solid medium remained adhering to the seeds after treatment.

(Retention of medium adhering to seeds)

The results are shown in Table 6.

TABLE 6

| | Method | Medium | Crop | Amount recovered (g) | Residual adhesion (%)* |
|---|---|---|---|---|---|
| Comparative Example | OP | SPP Aqueous solution | Onion | — | — |
| | | | Carrot | — | — |
| | SMP | Agro-Lig Black particles | Onion | 24.3 | 24.3 |
| | | | Carrot | 28.6 | 38.1 |
| | MC | Micro-Cel E White particles | Onion | 3.4 | 22.6 |
| | | | Carrot | 10.1 | 40.4 |
| Example | HSAP | BL100 White spherical | Onion | 0.0 | 0.0 |
| | | | Carrot | 0.0 | 0.0 |

OP: Osmotic priming.
SMP: Solid matrix priming.
MC: Matriconditioning.
HSAP: Controlled hydration treatment with super-absorbent polymer.
*: Ratio of weight of medium recovered by peeling off to total weight of medium used for controlled hydration treatment.

In OP, the medium was a liquid and the seeds were washed with water for separation from the medium. Therefore, no residual adhesion of the medium to the seeds was observed.

In SMP, the medium was observed remaining in large amounts as adhering to the seeds in the step of sieving directly after controlled hydration treatment. After seed drying, the residual medium (Agro-Lig) adhering to seeds was forcibly peeled off; a large amount of the medium was recovered. The residual adhesion percentage values were high, namely 24.3% (onion) and 38.1% (carrot).

In MC, in the step of sieving directly after controlled hydration treatment, adhesion of a large amount of the medium was observed, like in the case of SMP. Micro-Cel E was recovered by forced peeling after seed drying, with residual percentages of 22.6% (onion) and 40.4% (carrot).

In HSAP, seeds could be separated from the medium with certainty by sieving directly after controlled hydration treatment, hence the residual adhesion of the medium to seeds was 0%.

Furthermore, in SMP and MC, even after forced peeling of the medium adhering to seeds, the removal of the medium was incomplete and a small amount of the medium was found remaining on the seed surface. The residual amount was estimated, from the observed seed surface appearance, to be approximately the same as in the ordinary case of coating of seeds with a pesticide dust coating.

EXAMPLE 3

Tomato seeds were treated for controlled hydration in the neutral pH region (5 to 9) using three superabsorbent polymers differing in chemical composition, The treated seeds were subjected to testing for germination and the three polymer species used were compared with respect to the effects of treatment.

Thus, controlled hydration treatment of tomato seeds was carried out in the same manner as in Example 1 using three superabsorbent polymers, namely crosslinked sodium acrylate polymer, crosslinked starch-polyacrylic acid copolymer, and crosslinked vinyl alcohol-polyacrylic acid copolymer.

Using the treated seeds after drying, a germination test was performed following placing in petri dishes, for comparison among the superabsorbent polymers used in the controlled hydration treatment with respect to the effects of treatment. No significant differences in treatment effect ascribable to the differences in superabsorbent polymer species were observed.

In view of this, it may be concluded that any superabsorbent polymer can be used in controlled hydration treatment to produce the same treatment effects irrespective of chemical composition if it shows a pH of harmless to seeds and has certain appropriate properties (water-absorbing power, slow water release property, particle size, flowability).

We claim:

1. A method of improving seed germination, comprising the steps of:

causing super absorbent polymer particles of a super absorbent polymer to absorb an amount of water which is significantly less than the amount of water they are able to absorb to form water-holding polymer particles with surfaces having elastic stiffness, thereby preventing substantial adhesion between mutual water-holding polymer particles;

stirring seeds and the water-holding polymer particles so that surfaces of each of the seeds contact the water-holding polymer particles with essentially substantial adhesion between the seeds and the water-holding polymer particles, to form a mixture of the polymer particles and the seeds, thereby causing the seeds to imbibe water released from the water-holding polymer particles as a result of the seeds contacting the water-holding polymer particles;

further stirring said mixture, so that said contact is continued for a period of time sufficient to permit the seeds to enhance their vigor for sprouting, but insufficient to cause sprouting;

supplying an oxygen-containing gas into said mixture substantially concurrently with said step of further stirring; and sieving the mixture to separate the seeds from said mixture to yield seeds having essentially no residue of the polymer of the polymer particles adhering to their surfaces, after said step of further stirring.

2. The method of claim 1, further comprising a step of drying said seeds to an air-dry state, after said step of sieving.

3. The method of claim 2, wherein said air-dry state is when the seeds have substantially equal water content to that of the seeds before treatment.

4. The method of claim 1, wherein the super absorbent polymer of the polymer particles is at least one selected from the group consisting of cross-linked polyacrylic acid salts, cross-linked isobutylene-maleic acid copolymer derivatives, cross-linked starch-polyacrylic acid salts, cross-linked polyvinyl alcohol-polyacrylic acid salts, cross-linked polyvinyl alcohol derivatives, cross-linked polyethylene glycol derivatives, and cross-linked carboxymethyl cellulose derivatives.

5. The method of claim 1, wherein said super absorbent polymer particles absorb an amount of water of 7 times their weight, while said super absorbent polymer particles can absorb about 80–120 times their weight in water.

6. The method of claim 1, wherein said water-holding polymer particles are substantially spherically shaped.

7. The method of claim 1, wherein the volume ratio of the seeds to the water-holding super absorbent polymer particles is 0.2–5:1.

8. The method of claim 1, wherein said super absorbent polymer particles before absorbing water are of a size ranging from 50 to 300 μm.

9. The method of claim 1, further comprising a step of adding a fine powder of hydrophobic material to said super absorbent polymer particles so as to cover their surfaces for further preventing mutual adhesion, before said step of stirring.

10. The method of claim 9, wherein the hydrophobic material is at least one selected from the group consisting of hydrophobic silica, calcium stearate, magnesium stearate and barium stearate.

11. The method of claim 9, wherein 0.1–5 weight % of the hydrophobic material is added to the super absorbent polymer particles on the basis of the polymer weight before the super absorbent polymer particles are caused to absorb water.

12. The method of claim 9, wherein 0.1–5 weight % of the hydrophobic material is added to the super absorbent polymer particles on the basis of the polymer weight after the super absorbent polymer particles are caused to absorb water.

13. The method of claim 1, wherein the oxygen-containing gas is air or gaseous oxygen.

14. The method of claim 13, wherein the oxygen-containing gas is supplied to said mixture by aeration.

15. The method of claim 13, wherein the oxygen-containing gas is supplied to said mixture by replacement charging of oxygen or air.

16. A seed treated by the method according to claim 1, wherein the seeds yielded by the step of sieving the mixture to separate the seeds from said mixture contains essentially no residue of the polymer of the polymer particles.

* * * * *